C. H. EMERSON.
INSECT DESTROYER.
No. 190,838. Patented May 15, 1877.
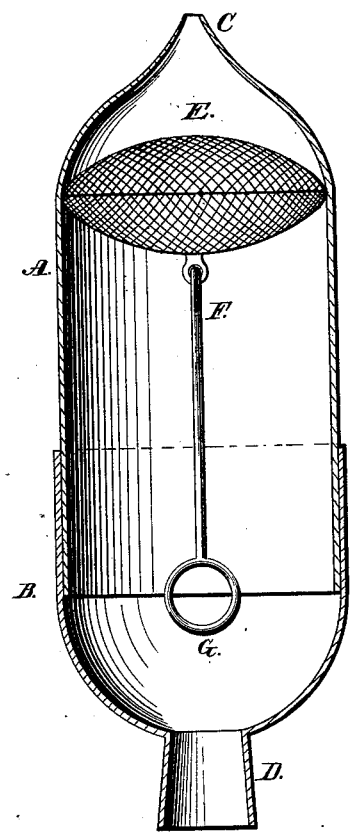

UNITED STATES PATENT OFFICE.

CHARLES H. EMERSON, OF WALTHAM, MASSACHUSETTS.

IMPROVEMENT IN INSECT-DESTROYERS.

Specification forming part of Letters Patent No. 190,838, dated May 15, 1877; application filed April 10, 1876.

*To all whom it may concern:*

Be it known that I, CHARLES H. EMERSON, of Waltham, in the county of Middlesex and State of Massachusetts, have invented a new and useful Improvement in Apparatus for Destroying Insects on Animals or Plants; and I do hereby declare that the following is a full and exact description thereof, reference being had to the accompanying drawing, which is a longitudinal section of the apparatus through its axis or center-line.

My invention relates to certain improvements in apparatus for burning tobacco or other noxious substances, and applying the vapors thus produced to the destroying or killing of insects on animals or plants, which improvements are also applicable to the ejecting of poisonous powders for the same purpose.

To enable others skilled in the art to make and use my invention, I shall now proceed to describe its construction and operation.

In the drawing, A B is the shell or chamber, made of copper or other suitable material, and is composed of the two parts A and B, which are fitted and united to each other by means of a slip or telescope-joint, as shown, so as to be readily taken apart or put together. The upper part A has a small vent or discharge-orifice at C, and the lower part B has a conical socket, D, opening into the chamber, to receive the nozzle of a pair of bellows. Within this chamber, and at its forward end, I place the wire strainer E, which is made somewhat in the form of an oblate spheroid of two pieces of wire cloth, united at their edges, and sufficiently large in diameter to hold itself in place when pressed down into the chamber. To this I attach the pendulous piece F, with a button or loop, G, at its end, for the purpose of drawing out the strainer when required, and also for stirring or shaking the dry powders within the chamber when the apparatus is used as a powder-ejector.

In preparing the instrument for use as a fumigator, I pull it apart, and fill in the chamber A, against the strainer E, with tobacco or other substance that is to be used; then dropping in a live coal of fire the two parts are immediately united, and the bellows applied, the working of which forces a current of air through the charge or chamber and out through the small vent C, which should be directed so as to accomplish the intended purpose.

Almost all domestic animals, and the houses and sheds occupied by them, are infested with lice, which have a very deleterious effect upon the animals; but by the judicious application of this fumigator or ejector both the animals and their houses may be completely cleared of such pests, and in like manner plants, flowers, and trees may be quickly relieved of the lice and insects peculiar to them.

Having thus described my improvements in apparatus for destroying insects by fumigation with noxious smoke, or by the ejection of poisonous powders, what I claim therein as my own invention, and desire to secure by Letters Patent of the United States, is—

The chamber A B, in combination with the spheroidal strainer E, constructed and operating in the manner and for the purpose substantially as herein described.

C. H. EMERSON.

Witnesses:
JOHN COCHRANE,
P. D. SCOTT.